M. J. FELLAND.
ELECTRIC SIGNAL FOR MOTION PICTURE PROJECTOR REELS.
APPLICATION FILED MAR. 13, 1917.

1,300,257.

Patented Apr. 15, 1919.
2 SHEETS—SHEET 1.

Melvin J. Felland
Inventor

By Geo. P. Kimmel
Attorney

M. J. FELLAND.
ELECTRIC SIGNAL FOR MOTION PICTURE PROJECTOR REELS.
APPLICATION FILED MAR. 13, 1917.

1,300,257.

Patented Apr. 15, 1919.
2 SHEETS—SHEET 2.

Melvin J. Felland
Inventor

By Geo. P. Kimmel
Attorney

UNITED STATES PATENT OFFICE.

MELVIN JOSEPH FELLAND, OF GREAT FALLS, MONTANA.

ELECTRIC SIGNAL FOR MOTION-PICTURE-PROJECTOR REELS.

1,300,257.　　　　　Specification of Letters Patent.　　Patented Apr. 15, 1919.

Application filed March 13, 1917. Serial No. 154,502.

*To all whom it may concern:*

Be it known that I, MELVIN JOSEPH FELLAND, a citizen of the United States, and resident of Great Falls, in the county of Cascade and State of Montana, have invented certain new and useful Improvements in Electric Signals for Motion-Picture-Projector Reels, of which the following is a specification.

This invention relates to electric signaling and has more particular reference to an improved electric signal for motion picture projector reels.

The invention has for its dominant object to provide an electric signal for use in conjunction with motion picture projectors of the continuous strip type, whereby, the operator will be apprised of the nearness of the film strip end, thus, allowing the reel to be removed from the magazine at the proper period and preventing damaging of the film strip.

It is also an object of the invention to provide novel circuit closing means, the same being adjustable in order that the alarm may be operated thereby at predetermined periods.

Furthermore, it is an object of the invention to provide an operating arm for actuating the circuit closing means to cause energization of the alarm, the said arm being yieldably engaged with the film strip as coiled about the reel and movable by the uncoiling or exhaustion of the strip therefrom.

Another important feature of the invention resides in the provision of means for holding the operating arm of the circuit closing means in its engaged position to facilitate the removal of the reel from the projector magazine.

The invention consists, furthermore, in the novel arrangements and combinations of the parts of the device, as well as in the details of the construction of the same, all of which will be more fully described in the following specification and then finally embodied in the clauses of the claims, which are appended to the specification and which form an essential part of the same.

The invention is clearly illustrated in the accompanying drawings, in which.

Similar characters of reference are employed in all of the above described views to indicate corresponding parts.

Figure 1:
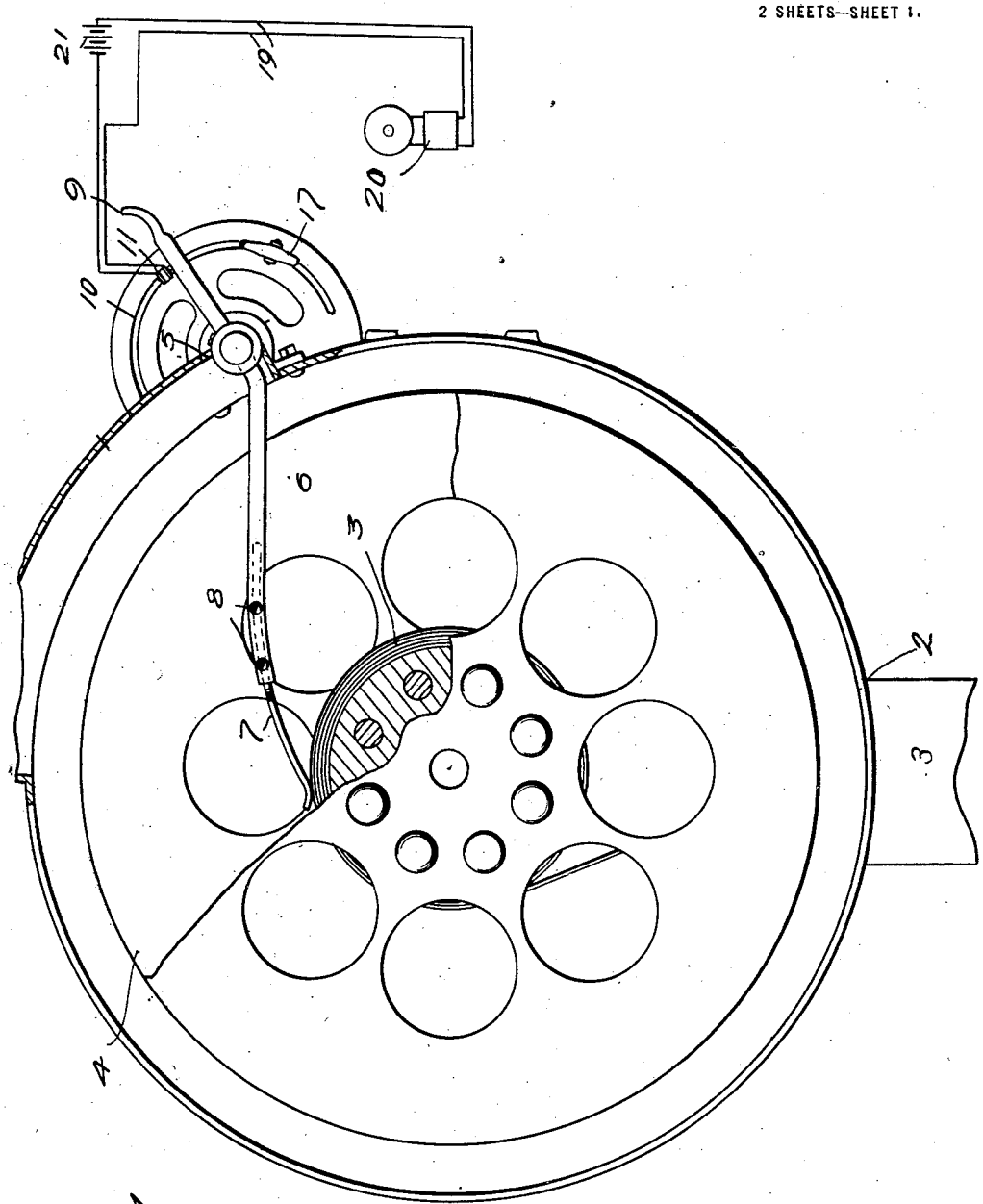
Figure 1 is a side elevation of a motion picture projector reel with parts thereof broken away having my improved electric signal applied thereto.
Figure 2:
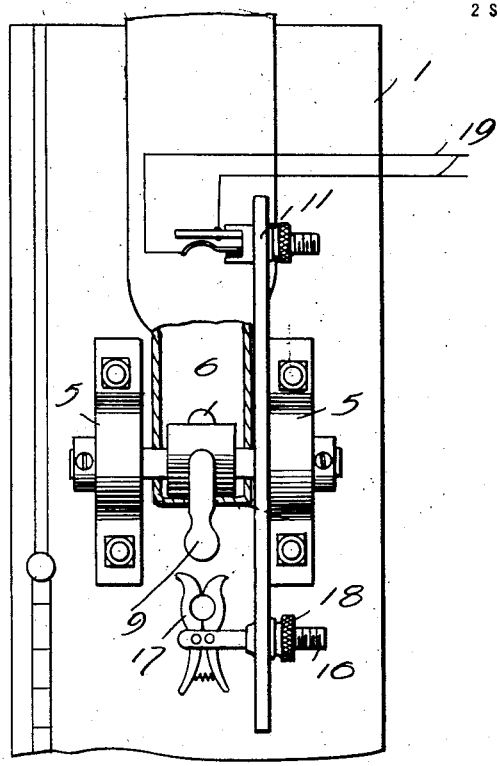
Fig. 2 is a fragmentary detail in end elevation showing the arrangement of the circuit closing means upon the magazine of the projector.

Referring now more specifically to the several figures of the said drawings, it is to be noted that I have shown by way of illustration, my improved alarm as applied to the usual circular housing or magazine for motion picture machines, designated 1 having an outlet passage 2 formed therein, whereby, the film strip 3 as coiled about the reel 4 rotatably mounted in the said magazine may be fed therefrom to the projecting apparatus of the machine.

Secured to the outer side of the magazine 1 are bearing brackets 5, which pivotally support therein an operating arm 6, it being noted that the said arm is pivotally mounted intermediate its ends and has one extremity thereof curved upwardly and formed hollow whereby a forced film strip engaging member 7 may be telescopically engaged therewith. To retain the film strip engaging element 7 in an adjusted position within the hollow portion of the pivotal arm 6, a plurality of set screws 8 are preferably turned into engagement with suitable screw threaded openings formed therein and have their inner extremities bearing upon the shank of the element. A finger piece 9 is formed upon the remaining extremity of the pivotal arm 6 and obviously, affords means whereby the film strip engaging portions of the same may be moved into position to permit removal of the reel 3 from the magazine. It is of course to be understood, that a suitable opening is formed within that portion of the magazine as adjacent the bearing bracket 5 whereby the upwardly curved portion of the pivotal arm 6 may be passed thereinto into engagement with the film strip 3. Further, it is to be also noted that the film strip engaging portion of the arm 6 is of a weight greater than that portion of the same as carrying the finger piece 9 and as a consequence, the forked element 7 will be normally maintained in yieldable engagement with the film strip coiled about the reel. A semi-circular dial is secured to one of the bearing brackets 5 and 5ᵃ provided with a curved elongated slot 10, whereby a circuit closing element designated in its entirety by the numeral 11 may be adjustably received therein. The circuit closing element 11 includes a screw threaded shank having a bifurcated head portion 12, one of the lateral portions of the said bifurcated portion having a contact 13 secured thereto while the remaining lateral portions have a second contact 14 secured thereto, the said contact 14 being curved inwardly and further being formed of resilient metal, whereby the same may be readily flexed and engaged with the rigid contact 13. A thumb nut 15 is engageable with the screw threaded portion of the shank and, as will be understood, when the said shank is passed through the curved elongated slot 10, will serve as efficient means for maintaining the circuit closing element in its adjusted position. If desired, a series of graduations may be arranged upon the dial adjacent the elongated slot 10, thereby, enabling the operator to accurately adjust the circuit closing element 11 according to the length of the film strip coiled about the various reels.

A second screw threaded shank 16 is passed through the elongated slot 10 and carries upon its bifurcated end portion free gripping jaws 17, the said jaws being so formed as to receive the adjacent portion of the pivotal arm 6 therein and to retain the same in a position to permit the removal of the reel 4 from the magazine upon the exhaustion of the film strip therefrom. The arranging of the arm in its out of the way position also enables the placing of reels within the magazine. To secure the shank 16 in an adjusted position within the slot 10, a thumb nut 18 is turned into engagement therewith.

Figure 3:
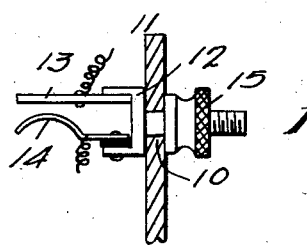
Fig. 3 is a detail of the circuit closing element.
Figure 4:
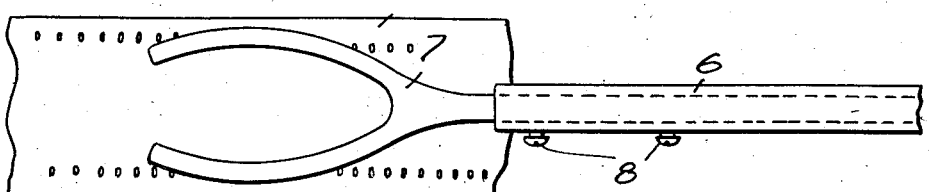
Fig. 4 is a fragmentary detail in top plan of the operating arm for the circuit closing element.

Electrical conductors 19 are engaged with the several contacts 13 and 14, as shown in the Fig. 3 and have their remaining extremities engaged with the contact terminals of an electric bell or other suitable signal 20. A source of continuous electrical energy 21 is interposed in one of the conductors 19 in order that the necessary energy may be supplied to the signal 20.

In operation, the upwardly curved portion of the pivotal arm 6 is so arranged as to permit a constant and yieldable engagement of the forced strip engaging element 7 with the film strip upon the reel 4. Obviously, as the film strip is uncoiled from the reel, the free extremity of the pivotal arm will be moved gradually upward until the same engages flexible contact 14 of the contact element 11, forcing the same into engagement with the contact 13 and closing an electric circuit through the conductors 19 and the bell 20, thereby, warning the operator of the approach of the end of the film strip. To remove the reel from the magazine of the projector machine, the finger piece 9 of the arm 6 is engaged and forced downwardly until the said arm is received between the yieldable gripping jaws 17, whereat, it will be held and the removal of the reel from the magazine expedited. By varying the positioning of the contact element 11 and the gripping jaws 17 within the elongated slot 10 of the dial, it is apparent, that the electric signaling circuit may be operated at predetermined intervals according to the length of the film strip upon the reel and that the pivotal arm 6 may be held in various positions to permit the removal and placing of reels within the magazine of the projector machine.

As hereinbefore indicated, I do not wish to be understood as confining the invention to the particular embodiments chosen for illustration herein, nor to the exact construction and arrangement and adaptation of the parts shown and described, but I reserve the right to make any changes and alterations that fairly fall within the spirit and scope of the invention.

I claim:

1. An alarm for motion picture projector reels, including a pivotal arm, an electric circuit including a signal therein, an adjustable circuit closing element engageable by the arm arranged in proximity to the reel, and means arranged in proximity to said circuit closing element for receiving and holding the pivotal arm in neutral position at times.

2. An alarm for motion picture projector reels, including a pivotal arm, an electric circuit including a signal therein, an adjustable circuit closing element engageable by the arm positioned in proximity to the reel, and an adjustable clasp arranged in proximity to the reel for receiving and holding the pivotal arm in neutral position at times.

3. In combination with a motion picture reel casing, a bracket secured to the peripheral portion thereof having a segmental slot formed therein, an arm pivoted to the bracket engageable with the film strip arranged in the casing, an electrical circuit including a signal, a circuit closing element adjustably arranged in the segmental slot connected to the opposite sides of the electrical circuit, and a clasp adjustably arranged in the segmental slot adapted to engage and hold the adjacent end of the pivotal arm in neutral position at times.

In testimony whereof I affix my signature hereto.

MELVIN JOSEPH FELLAND.